(12) United States Patent
Brown

(10) Patent No.: US 11,449,864 B2
(45) Date of Patent: Sep. 20, 2022

(54) REISSUING OBLIGATIONS TO PRESERVE PRIVACY

(71) Applicant: R3 Ltd., London (GB)

(72) Inventor: Richard G. Brown, London (GB)

(73) Assignee: R3 LTD.

( * ) Notice: Subject to any disclaimer, the term of this patent is extended or adjusted under 35 U.S.C. 154(b) by 461 days.

(21) Appl. No.: 15/799,930

(22) Filed: Oct. 31, 2017

(65) Prior Publication Data
US 2019/0130398 A1    May 2, 2019

(51) Int. Cl.
*G06Q 20/40* (2012.01)
*G06Q 20/38* (2012.01)
(Continued)

(52) U.S. Cl.
CPC ........... *G06Q 20/401* (2013.01); *G06Q 20/02* (2013.01); *G06Q 20/065* (2013.01); *G06Q 20/223* (2013.01); *G06Q 20/382* (2013.01); *G06Q 20/3825* (2013.01); *G06Q 20/3829* (2013.01); *G06Q 20/38215* (2013.01); *H04L 9/0825* (2013.01); *H04L 9/3239* (2013.01); *H04L 9/3247* (2013.01); *H04L 9/3263* (2013.01); *G06Q 2220/00* (2013.01); *H04L 2209/38* (2013.01); *H04L 2209/56* (2013.01)

(58) Field of Classification Search
CPC ......... G06Q 40/00–128; G06Q 20/401; G06Q 20/065; G06Q 20/223; G06Q 20/382; G06Q 20/38215; G06Q 20/02; G06Q 20/3825; G06Q 20/3829; G06Q 2220/00; H04L 9/3263; H04L 9/3247; H04L 9/3239; H04L 2209/38; H04L 2209/56
See application file for complete search history.

(56) References Cited

U.S. PATENT DOCUMENTS 7,571,132 B2 *  8/2009  Cole ................... G06Q 20/102
                                                           705/37
8,131,648 B2 *  3/2012  Barton ................ H04N 9/8042
                                                           705/59
(Continued)

FOREIGN PATENT DOCUMENTS

WO        20160170538 A1     10/2016

OTHER PUBLICATIONS

Ron White, How Computers Work, 7th edition (Year: 2003).*
(Continued)

*Primary Examiner* — John W Hayes
*Assistant Examiner* — Taylor S Rak
(74) *Attorney, Agent, or Firm* — Perkins Coie LLP

(57) ABSTRACT

A system is provided for reissuing obligations whose ownership is recorded in a distributed ledger to preserve the identity of prior owners of the obligations. The system accesses a target transaction in which an issuer has a target obligation to a target owner specified in the target transaction. The target transaction has one or more ancestor transactions that each specify an owner. The system retires the target transaction so that the issuer no longer has the target obligation. The system then receives an indication that the issuer created a reissue transaction in which the issuer has a reissued obligation to the target owner that is specified in the reissue transaction. The reissue transaction does not have any ancestor transactions.

20 Claims, 13 Drawing Sheets

(51) Int. Cl.
  *G06Q 20/06* (2012.01)
  *H04L 9/32* (2006.01)
  *G06Q 20/22* (2012.01)
  *G06Q 20/02* (2012.01)
  *H04L 9/08* (2006.01)

(56) References Cited

U.S. PATENT DOCUMENTS

| | | | | |
|---|---|---|---|---|
| 2002/0013767 A1* | 1/2002 | Katz | ............... | G06Q 40/02 705/39 |
| 2002/0152162 A1* | 10/2002 | Eda | ............... | G06Q 20/02 705/39 |
| 2002/0178077 A1* | 11/2002 | Katz | ............... | G06Q 10/10 705/7.36 |
| 2003/0135441 A1* | 7/2003 | Ginsberg | ............... | G06Q 40/04 705/37 |
| 2005/0071205 A1* | 3/2005 | Terlizzi | ............... | G06Q 40/08 705/4 |
| 2007/0250704 A1 | 10/2007 | Hallam-Baker | | |
| 2009/0198528 A1* | 8/2009 | Kahn | ............... | G06Q 10/02 705/5 |
| 2010/0185864 A1 | 7/2010 | Gerdes, Jr. et al. | | |
| 2014/0222638 A1* | 8/2014 | Groarke | ............... | G06Q 40/04 705/37 |
| 2016/0292680 A1* | 10/2016 | Wilson, Jr | ............... | G06Q 20/40 |
| 2017/0132621 A1* | 5/2017 | Miller | ............... | G06Q 20/3829 |
| 2019/0080405 A1* | 3/2019 | Molinari | ............... | G06Q 20/06 |

OTHER PUBLICATIONS

Khan, Chris et al. "A Distributed-Ledger Consortium Model for Collaborative Innovation", Computer, vol. 50, No. 9, Sep. 1, 2017, pp. 29-37.
International Search Report and Written Opinion issued for PCT/GB2018/053097 dated Apr. 9, 2019, 19 pages.
Nakamoto, Satoshi, "Bitcoin: A Peer-to-Peer Electronic Cash System," http://www.bitcoin.org/bitcoin.pdf, pp. 1-9, Jul. 4, 2010.

* cited by examiner

REISSUING OBLIGATIONS TO PRESERVE PRIVACY

BACKGROUND

The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner, as represented by the new owner public key. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UTXO") set because it tracks the output of all transactions that have not yet been spent.

Although the bitcoin system has been very successful, it is limited to transactions in bitcoins or other cryptocurrencies. Efforts are currently underway to use blockchains to support transactions of any type, such as those relating to the sale of vehicles, sale of financial derivatives, sale of stock, payments on contracts, and so on. Such transactions use identity tokens, which are also referred to as digital bearer bonds, to uniquely identify something that can be owned or can own other things. An identity token for a physical or digital asset is generated using a cryptographic one-way hash of information that uniquely identifies the asset. Tokens also have an owner that uses an additional public/private key pair. The owner public key is set as the token owner identity, and when performing actions against tokens, ownership proof is established by providing a signature generated by the owner private key and validated against the public key listed as the owner of the token. A person can be uniquely identified, for example, using a combination of a user name, social security number, and biometric (e.g., fingerprint). A product (e.g., refrigerator) can be uniquely identified, for example, using the name of its manufacturer and its serial number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a blockchain establishes provenance of the asset, and the identity token can be used in transactions (e.g., buying, selling, insuring) of the asset stored in a blockchain, creating a full audit trail of the transactions.

To record a simple transaction in a blockchain, each party and asset involved with the transaction needs an account that is identified by a digital token. For example, when one person wants to transfer a car to another person, the current owner and next owner create accounts, and the current owner also creates an account that is uniquely identified by the car's vehicle identification number. The account for the car identifies the current owner. The current owner creates a transaction against the account for the car that indicates that the transaction is a transfer of ownership, indicates the public keys (i.e., identity tokens) of the current owner and the next owner, and indicates the identity token of the car. The transaction is signed by the private key of the current owner, and the transaction is evidence that the next owner is now the current owner.

To enable more complex transactions than bitcoin can support, some systems use "smart contracts." A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset. The inputs to a smart contract to sell a car may be the identity tokens of the seller, the buyer, and the car and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is in Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide which transactions to keep and which transactions to discard. Although the execution of the computer code at each node helps ensure the authenticity of the blockchain, it requires large amounts of computer resources to support such redundant execution of computer code.

Although blockchains can effectively store transactions, the large amount of computer resources, such as storage and computational power, needed to maintain all the replicas of the blockchain can be problematic. To overcome this problem, some systems for storing transactions do not use blockchains, but rather have each party to a transaction maintain its own copy of the transaction. One such system is the Corda system developed by R3, Ltd., which provides a decentralized distributed ledger platform in which each participant in the platform has a node (e.g., computer system) that maintains its portion of the distributed ledger. When parties agree on the terms of a transaction, a party submits the transaction to a notary, which is a trusted node, for notarization. The notary maintains an UTXO database of unspent transaction outputs. When a transaction is received, the notary checks the inputs to the transaction against the UTXO database to ensure that the outputs that the inputs reference have not been spent. If the inputs have not been spent, the notary updates the UTXO database to indicate that the referenced outputs have been spent, notarizes the transaction (e.g., by signing the transaction or a transaction identifier with a public key of the notary), and sends the notarization to the party that submitted the transaction for notarization. When the party receives the notarization, the party stores the notarization and provides the notarization to the counterparties.

In many industries, one entity is contractually obligated to provide a certain quantity of an item or asset to another entity. For example, a bank may, in exchange for payment, create an obligation to pay a certain amount of money to a customer who has funds on deposit with the bank to cover the obligation. The bank issues a transaction that is recorded in a distributed ledger specifying that the customer is the owner of the obligation. The customer can then transfer that obligation to another entity, such as a supplier who supplies products to the customer of the bank. To transfer the obligation to the supplier, another transaction that references the issuing transaction is recorded in the distributed ledger specifying that the obligation is now owned by the supplier. The supplier can then tender the obligation to the bank for payment, assuming the obligation is payable on demand. The supplier could alternatively transfer the obligation to another party or split the obligation by recording multiple transactions that each transfer ownership of part of the original obligation. Each of those transactions would reference the transaction that transfers the obligation to the supplier. In addition, if the supplier is the owner of multiple obligations from the same bank, the supplier could combine the obligations into a single obligation by recording a transaction that references the multiple obligations.

A transaction needs to reference its input transactions so that the notary can make a determination of whether the outputs of the input transactions have been consumed or spent. Also, a party can follow the references to input transactions of the transaction to check whether the input transactions were performed correctly, follow the references to those input transactions of the input transactions to check whether those input transactions were performed correctly, and so on until a transaction is encountered with no input transactions (i.e., a transaction corresponding to the issuance of an obligation). Because transactions reference prior transactions, information about the prior owner of an obligation could be derived by accessing those prior transactions. For example, each transaction may include the public key of the owner. If a party has previously dealt with that owner, the party may know the public key of the owner and can thus identify the owner. Even if the party cannot identify an owner, the party may be able to glean other information such as how much money is paid to a supplier, what the profit made by a supplier is, and so on.

DETAILED DESCRIPTION

Figure 1:
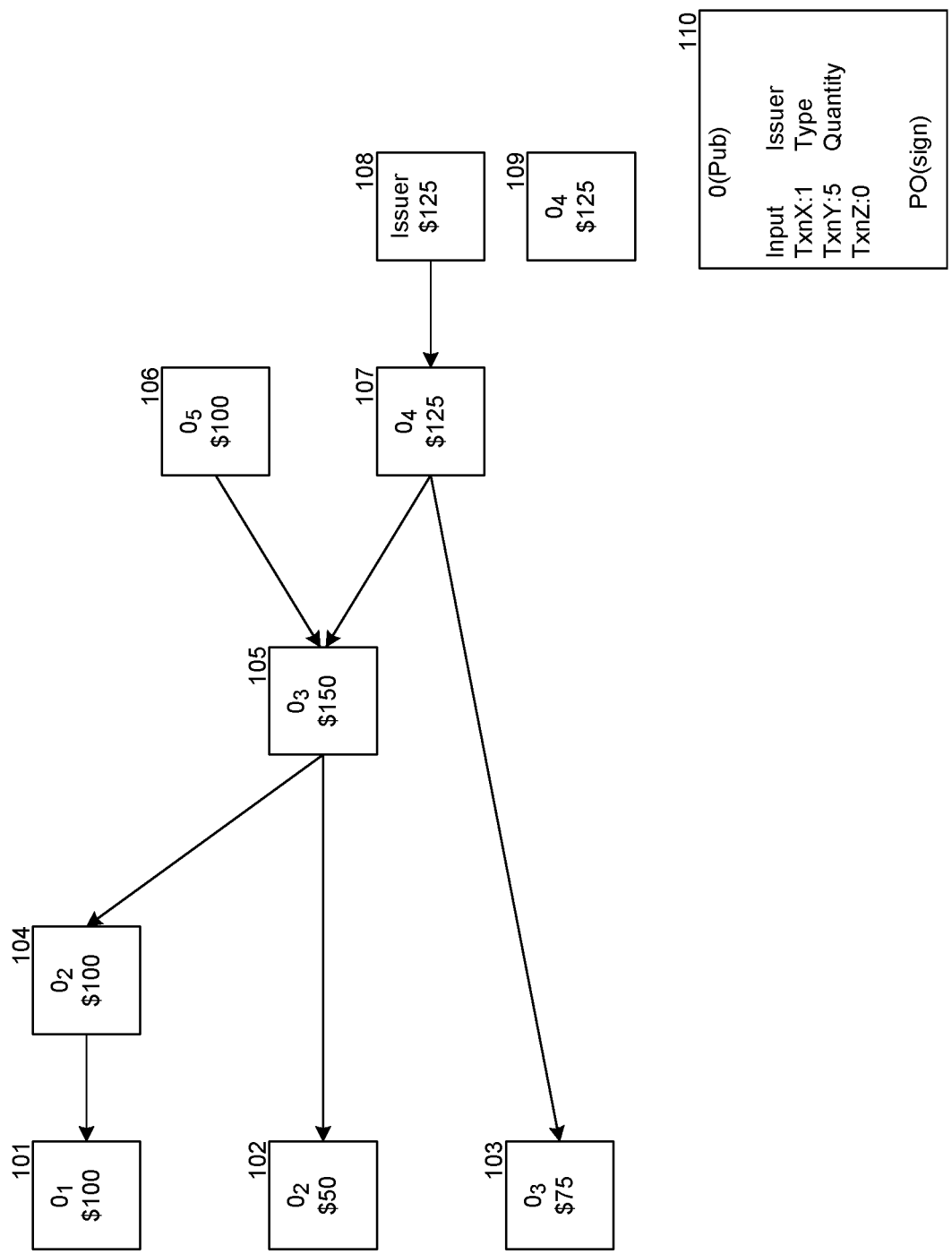
FIG. 1 is a diagram illustrating transactions including a transfer transaction and a reissue transaction.

A method and system are provided for reissuing obligations, whose ownership is transferred via transactions recorded in a distributed ledger, to provide privacy for prior owners of obligations. In some embodiments, a reissue obligation ("RO") system is provided that allows a target obligation to be retired and then reissued so that the prior owners (e.g., identified by their public keys) of the target obligation cannot be identified from the reissued obligation. The distributed ledger stores a target transaction that identifies a target obligation such as that the issuer is obligated to provide a quantity of an asset (e.g., money or a commodity) to the current owner identified in the target transaction in accordance with the terms of the target obligation. For example, the target obligation may be that the issuer is obligated to deliver 500,000 shares of stock of company A to the current owner of the obligation on a certain date. The target transaction may be linked to a chain of ancestor transactions that split, combine, or transfer obligations resulting in the target obligation represented by the target transaction.

In some embodiments, when the target obligation is to be reissued, the current owner may generate a signed transfer transaction that names the issuer as the new owner of the target obligation. The current owner then sends the signed transfer transaction to the issuer with an indication that the target obligation is to be reissued. After confirming the validity of the signed transfer transaction, the issuer signs the transfer transaction and forwards it to the notary. Upon receiving the notarized transfer transaction, the issuer records the notarized transfer transaction in the distributed ledger and sends it to the now-prior owner of the target obligation. The issuer may also generate a signed reissue transaction indicating that the prior owner of the target obligation is the current owner of the reissue obligation with the same quantity of the asset as the target obligation and may send the signed reissue transaction to its current owner (i.e., the now-prior owner of the target obligation). An issue or reissue transaction may not need to be notarized because the signature of the issuer may be sufficient to ensure the validity of the issue or reissue transaction.

In other embodiments, when the target obligation is to be reissued, the current owner of the target obligation as specified by the target transaction may send to the issuer a proposal to reissue the target obligation as a reissued obligation via a reissue transaction with no ancestor transactions. In response, the issuer may send to the current owner a proposed transfer transaction (signed by the issuer) to transfer ownership of the target obligation to the issuer, which would retire the target obligation. The current owner then signs the transfer transaction, coordinates the notarizing of the transfer transaction, and sends the notarized transfer transaction to the issuer. Upon receiving the notarized transfer transaction, the issuer sends to the owner (formerly the current owner, now the previous owner) of the target obligation a reissue proposal to reissue the target obligation as a reissued obligation with the same quantity and same terms as the now retired target obligation. The previous owner then sends a signed proposed reissue transaction to the issuer specifying that the previous owner of the target transaction is to be the current owner of the reissued obligation. Upon receiving the proposed reissue transaction, the issuer signs the reissue transaction, coordinates the notarizing of the reissue transaction, sends the notarized reissue transaction to the now current owner and records the notarized reissue transaction. Upon receiving the notarized reissue transaction, the current owner of the reissued obligation records the notarized transaction in the distributed ledger.

Because there are no prior owners of the reissued obligation, the reissue transaction does not reference any ancestor transactions. Thus, a party that has access to the reissue transaction cannot identify any prior owners (e.g., via public keys of the prior owners) of the target obligation given the reissue transaction. Thus, the privacy of the prior owners of the target obligation is preserved by reissuing the target obligation as a reissued obligation. Although an issuer may not receive a direct benefit (e.g., payment) for reissuing an obligation, issuers may have an incentive to support the reissuing of obligations as a service that would make dealing with the issuer more attractive to its customers and potential customers. In addition, the reissuing of obligations may allow for transactions in obligations to be verified more efficiently because the number of ancestor transactions that need to be checked can be greatly reduced. Indeed, if every transfer in ownership from the current owner to the next owner automatically includes a transfer transaction to the issuer and a reissue transaction with the next owner as the current owner of the reissued obligation, then there are no ancestor transactions that need to be verified. As a result, the computational resources needed to transfer obligations can be greatly reduced as communications between nodes to retrieve ancestor transactions can be avoided, verification of the correctness of ancestor transactions can be avoided, and so on. In addition, the privacy of prior owners of obligations is preserved.

As described above, the retiring of a target obligation and the issuing of the reissued obligation is not performed as an atomic operation. For example, an untrusted issuer could accept the transfer transaction but refuse to issue the reissued obligation. In such a case, the issuer would have retired the target obligation to its benefit without issuing the reissued obligation to the prior owner's detriment. So the RO system as described above is premised on the issuer of an obligation being trusted. In some embodiments, the notary may support notarizing a compound retire transaction involving a transfer transaction and a reissue transaction. In such a case, both the issuer and the current owner of the target obligation sign a compound transaction that includes the signed transfer transaction and the signed reissue transaction, each of which indicates that it is part of a compound transaction but does not identify the other transaction. After its verification processes (e.g., check for already consumed input states), the notary notarizes both the transfer transaction and the reissue transaction or neither. When both are notarized, the notary returns the notarized transactions to the party (i.e., the issuer or current owner of the reissued obligation) who sent the compound transaction. The party may then send the notarized transactions to the counterparty, or the issuer may send the notarized transactions to both parties. Thus, the retire transaction can be performed via an atomic operation. If a party tries to have the transfer transaction or the reissue transaction notarized, the notary will refuse to do so because the transaction itself identifies that it is part of a compound transaction and may include a hash of the other transaction.

As described above, the RO system is used with a distributed ledger that is not a blockchain, and thus a notary is used to check for consumed input states and to notarize transactions. In some embodiments, the RO system can be used with a distributed ledger that is a blockchain. For example, the RO system may be used to reissue obligations whose transactions are recorded in a public or private Ethereum blockchain. In such a case, a smart contract may support a reissue message to automatically reissue an obligation in compliance with the terms defined by the issuer and the original owner of the obligation. Also, as described above, the current owner of the target obligation initiates the reissue process. Alternatively, the issuer could initiate the reissue process. Also, the responsibility for proposing both the transfer transaction and the reissue transaction can be that of the issuer or that of the current owner, or the responsibility may be split so that the issuer proposes one transaction and the current owner proposes the other transaction.

In some embodiments, the RO system may employ a reissue criterion to determine when to reissue obligations. For example, the RO system may retrieve all the ancestor transactions of a target transaction and then analyze the ancestor transactions to determine whether the reissue criterion is satisfied. The reissue criterion may specify a certain number of ancestor transactions, a certain path length of ancestor transactions, a certain number of direct ancestors of an ancestor transaction, and so on. The RO system may check for the reissue criterion while ancestor transactions are being retrieved and, if the reissue criterion is satisfied, terminate the retrieving of additional ancestor transactions. Each issuer and owner may define their own reissue criterion. In some embodiments, any transfer of an obligation may need to be approved by the issuer. For example, an issuer may be required by law to prohibit transfer of an obligation to certain parties. In such a case, the issuer must be aware of all transfers of its obligation and can apply the reissue criterion to identify the obligations that should be reissued. A distributed ledger network may also have a network-wide reissue criterion defined for the network. If a transaction satisfies the network-wide reissue criterion, then the transaction is considered to be frozen in that it cannot be used as input to another transaction, except as input to a transfer transaction transferring ownership of the underlying obligation to the issuer. In this way, it can be ensured that the transactions of the network comply with the requirements of the network as specified by the reissue criterion. Although the reissue criterion is described primarily based on number or path length of ancestor transactions, other reissue criteria can be used. For example, the reissue criterion may factor in timing of the transactions, issuer of the transactions, value of the transactions, and so on.

In some embodiments, a target obligation may be only partially reissued. For example, if the target obligation is for 500,000 shares of stock, then the transfer transaction may specify 200,000 shares and the reissued obligation would be for 200,000 shares. The target transaction may be left unchanged, but the notary may record that 200,000 shares have been consumed. Alternatively, a new, descendant transaction of the target transaction may be created for an obligation of 300,000 shares.

In some embodiments, the identities of parties to a transaction can be kept confidential by generating confidential identities that are known only to the parties of the transaction and that may be unique to that transaction. A "party A" may have a well-known identity (e.g., "party A," a personal name, or a company name) that is certified by a well-known identity certificate $WKI.C_A$ issued by a certificate authority. To have a certificate issued, party A provides their public key $WKI.pub_A$ of their $WKI.pub_A/WKI.priv_A$ key pair and their identity or name (e.g., "party A") to the certificate authority. The certificate authority verifies that the requesting party is really party A. The verification can be whatever the certificate authority and users of the certificates deem is appropriate to prove that the requesting party is really party A. When verified, the certificate authority issues the well-known identity certificate $WKI.C_A$ for party A. The well-known identity certificate includes the public key $WKI.pub_A$ and the name $WKI.name_A$ of party A and is signed with the private key $WKI.priv_{CA}$ of the certificate authority. The $WKI.priv_{CA}$ of the certificate authority is kept secret by the certificate authority. A party who is presented with a public key pub and $WKI.C_A$ can verify that pub is the public key of party A identified by the $WKI.name_A$ by verifying using $WKI.pub_{CA}$ that $WKI.C_A$ was signed by the certificate authority and comparing pub to $WKI.pub_A$.

Although the party A can use $WKI.pub_A$ as its identifier in various transactions, anyone with access to $WKI.C_A$, which may be widely published, can determine that $WKI.name_A$ is the identity associated with $WKI.pub_A$. To help preserve the confidentiality of parties, a confidential identity ("CI") system allows for the generating of confidential identities that can be verified by confidential identity certificates issued by the parties themselves or by others on behalf of the parties. To create a confidential identity for party A, party A creates a public/private key pair $CI.pub_A/CI.priv_A$. Party A then creates a confidential identity certificate $CI.C_A$ with the public key $CI.pub_A$ and the name $CI.name_A$ that is signed using $WKI.priv_A$. Party A can then use $CI.pub_A$ as their identifier in a transaction with another party such as party B. Party A can provide $CI.C_A$ to party B as proof of the identity of $CI.pub_A$. Party B, who also has access to $WKI.C_A$ can use $WKI.pub_A$ to check the signature of $WCI.C_A$ and know that $CI.pub_A$ is a confidential identifier for party A as identified by $WKI.name_A$. Party A could alternatively provide only $CI.pub_A$ signed by $WKI.pub_A$ to party B along with an asserted identity, rather than $CI.C_A$, as party B can use the asserted identity to retrieve the $WKI.C_A$ and verify the signature on $CI.pub_A$. Party A may use a different confidential identity for each transaction so that an entity cannot ascertain that the same party was involved in the various transactions.

FIG. 1 is a diagram illustrating transactions including a transfer transaction and a reissue transaction. Blocks 101-109 each represent a transaction. Block 110 illustrates the contents of a transaction. Each transaction includes the public key of the current owner and is signed by the private key of the previous owner. Each transaction identifies an obligation that includes an issuer, type of asset, and quantity of the asset. A transaction, other than one for a newly issued obligation, includes the identification of inputs to the transaction. The input to a transaction identifies the ancestor transaction and an output of the ancestor transaction. Transaction 101 represents a newly issued transaction for an obligation with a quantity of $100 that is owned by owner $O_1$, transaction 102 represents a newly issued transaction for an obligation with a quantity of $50 that is owned by owner $O_2$, and transaction 103 represents a newly issued transaction for an obligation with a quantity of $75 that is owned by owner $O_3$. Transaction 104 represents a transfer of the obligation of the transaction 101 to a new owner $O_2$. Transaction 101 is an ancestor transaction of transaction 104, and transaction 104 is a descendent transaction of transaction 101. Transaction 104 includes a reference to transaction 101 as input to transaction 104. Transaction 105 represents a transfer of the obligations of transactions 102 and 104 with a combined quantity of $150 to a new owner $O_3$. Transaction 105 includes a reference to both transactions 102 and 104 as ancestor transactions. Transaction 105 represents a combining of the obligations of transactions 102 and 104. Transaction 106 represents a transfer of a portion—$100—of the obligation of transaction 105 to owner $O_5$. Transaction 107 represents a transfer of a portion—$50—of the obligation of transaction 105 and a transfer of the obligation of transaction 103 to owner $O_4$, resulting in the combined obligation of $125. Transactions 106 and 107 represent a split of the obligation of transaction 105. Transfer transaction 108 and reissue transaction 109 represent the reissuing of the obligation of transaction 107. The owner $O_4$ may initiate the reissuing of the obligation of transaction 107 by creating a transfer transaction 108 that transfers the obligation of transaction 107 to the issuer. The owner $O_4$ then creates the reissue transaction 109 with the same obligation—$125—as that of transaction 107. Reissue transaction 109 does not reference any ancestor transactions. As such, someone cannot identify owners $O_1$, $O_2$, or $O_3$ of prior transactions to transaction 108 from reissue transaction 109. The reissuing of the obligation results in the identity of these owners being preserved.

Figure 2A:
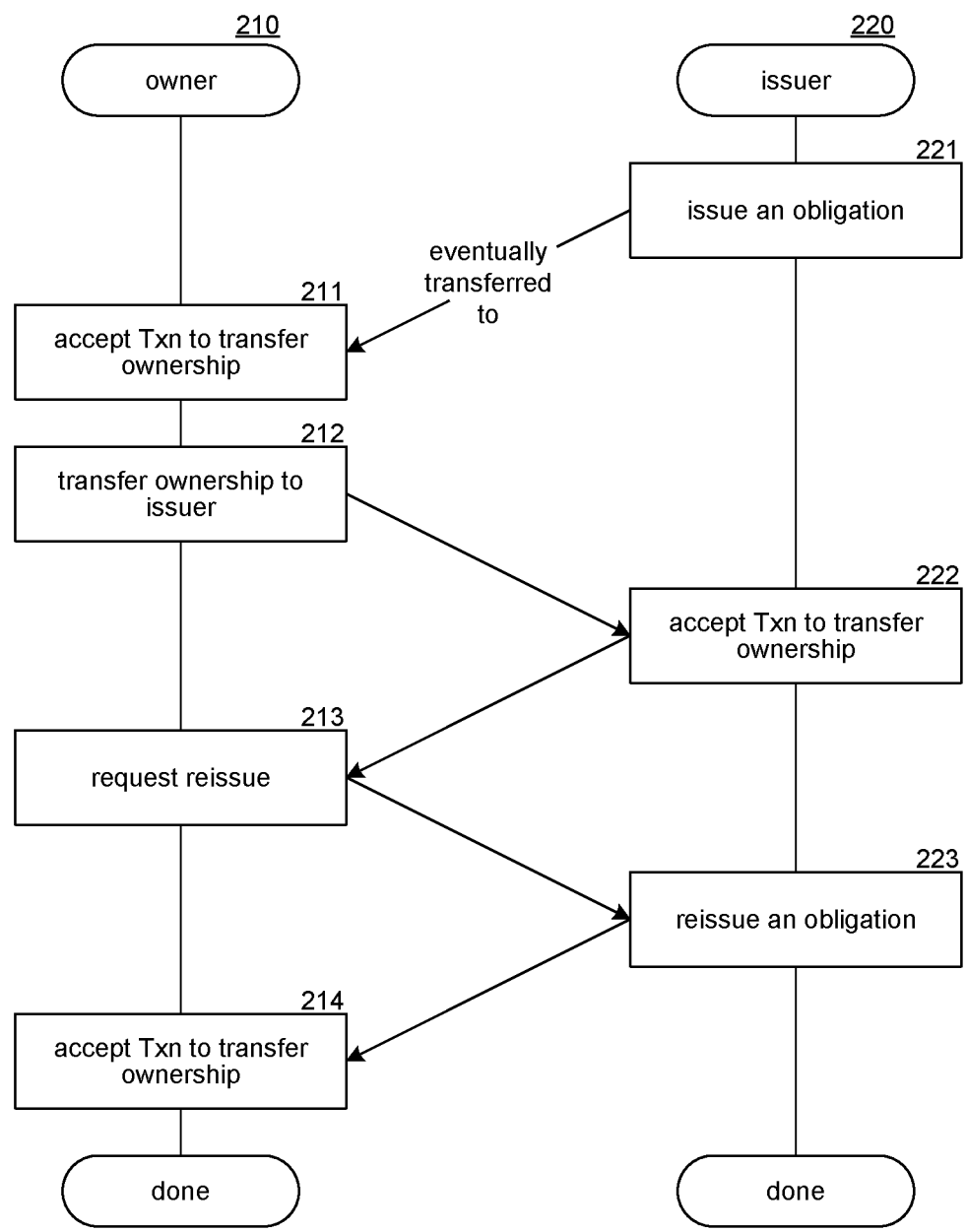
FIG. 2A illustrates flow diagrams of the processing of an owner and issuer to reissue an obligation in some embodiments.

FIG. 2A illustrates flow diagrams of the processing of an owner and issuer to reissue an obligation in some embodiments. An owner component 210 of the RO system illustrates the processing of the owner, and an issuer component 220 illustrates the processing of the issuer. In block 221, the issuer issues an obligation to an owner that is represented by an issue transaction. The obligation may be transferred through various parties and ultimately to the owner by recording transactions in the distributed ledger. In block 211, the owner component accepts the transaction, transferring the obligation to the owner. The owner at some point decides to have the obligation reissued to protect the privacy of prior owners. In block 212, the owner component transfers ownership of the obligation to the issuer to retire the obligation. In block 222, the issuer component accepts the transfer of ownership and responds to the owner. In block 213, the owner component then sends a reissue request to the issuer. In block 223, the issuer component reissues the obligation, represented by a reissue transaction recorded in the distributed ledger, and then completes. In block 214, the owner component accepts the reissue transaction and completes.

Figure 2B:
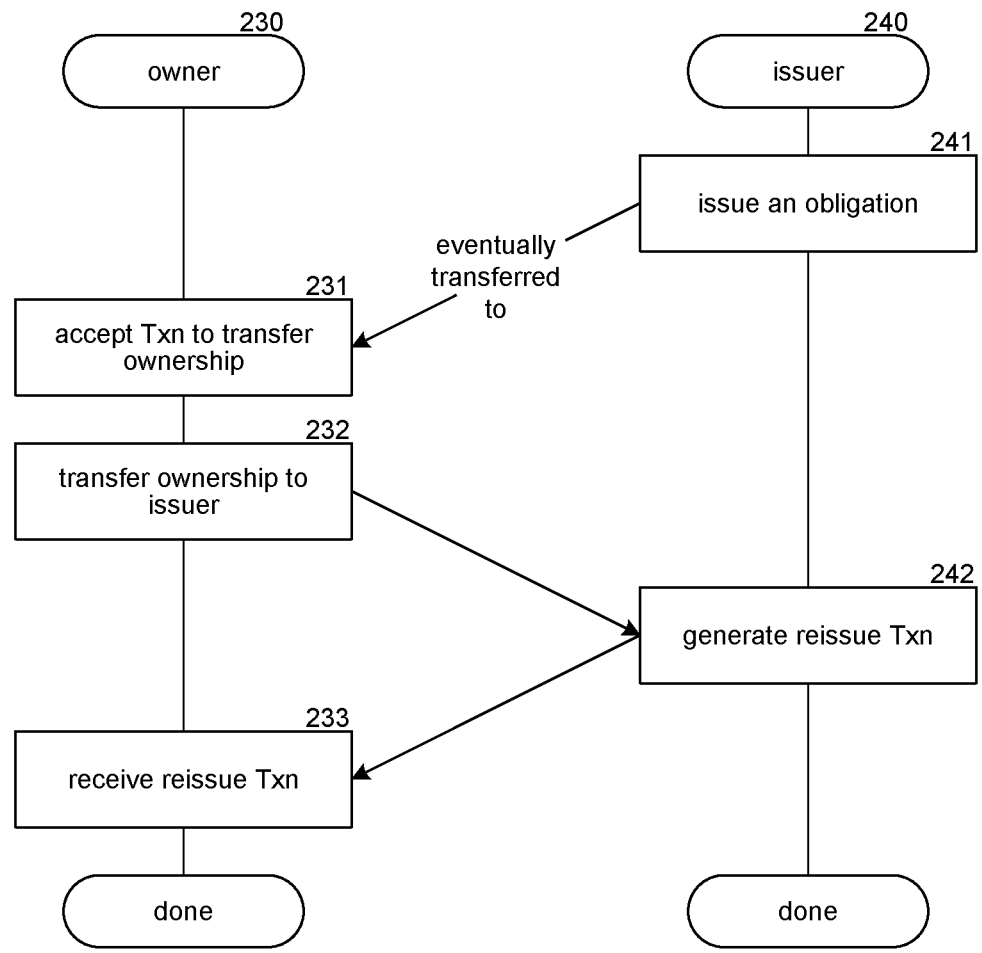
FIG. 2B illustrates flow diagrams of alternate processing of an owner and issuer to reissue an obligation in some embodiments.

FIG. 2B illustrates flow diagrams of alternate processing of an owner and issuer to reissue an obligation in some embodiments. An owner component 230 of the RO system illustrates the processing of the owner, and an issuer component 240 illustrates the processing of the issuer. In block 241, the issuer issues an obligation to an owner that is represented by an issue transaction. The obligation may be transferred through various parties and ultimately to the owner by recording transactions in the distributed ledger. In block 231, the owner component accepts the transaction transferring the obligation to the owner. The owner at some point decides to have the obligation reissued to protect the privacy of prior owners. In block 232, the owner component transfers ownership of the obligation to the issuer to retire the obligation by sending a transfer transaction to the issuer. In block 242, the issuer component accepts the transfer transaction (e.g., after the notary notarizes it), generates a reissue transaction, sends the reissue transaction to the owner, and then completes. In block 233, the owner component receives and records the reissue transaction, which may not need to be notarized because the issuer's signature may be sufficient to establish validity. The owner component then completes.

Figure 3:
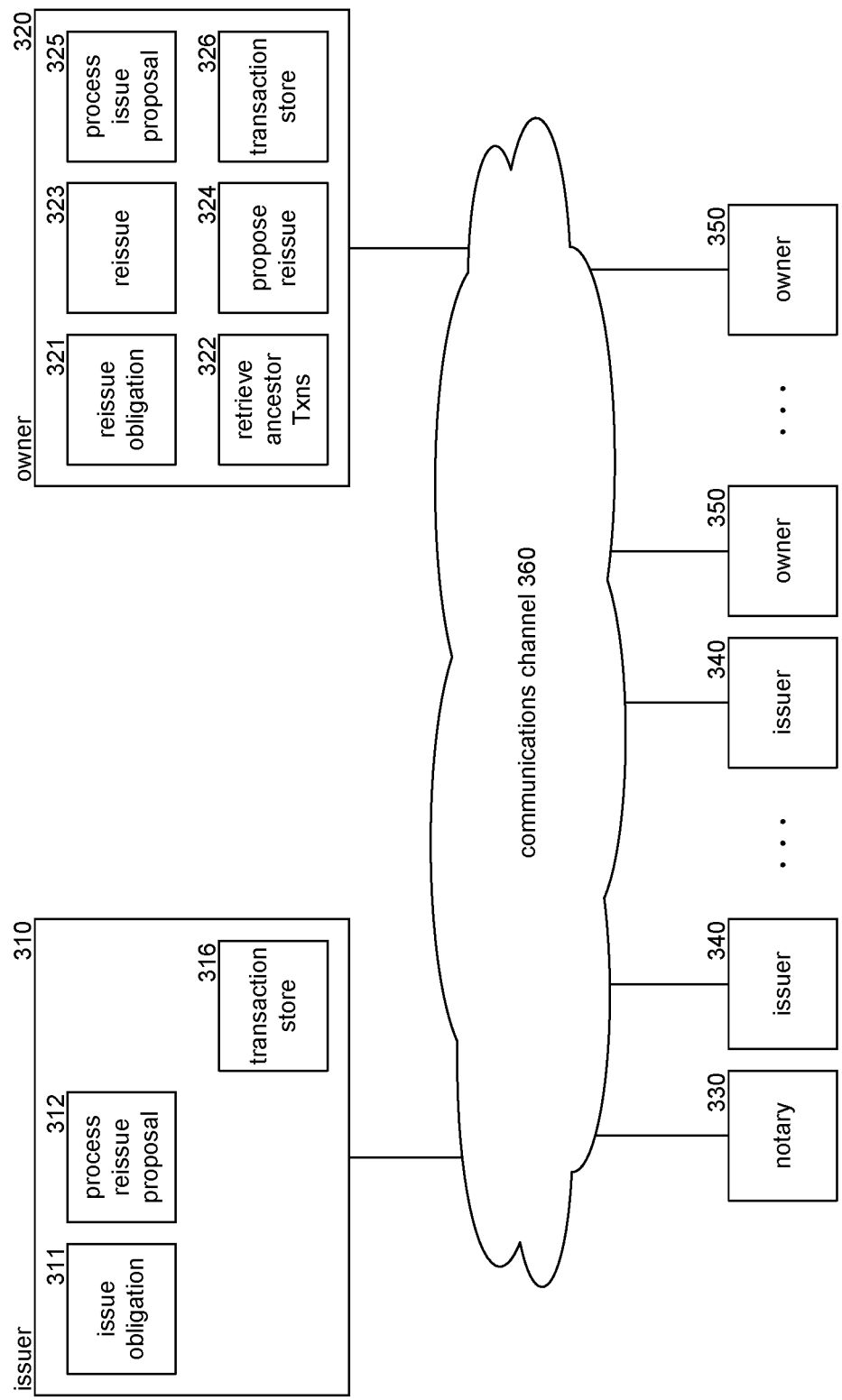
FIG. 3 is a block diagram that illustrates components of the RO system in some embodiments.

FIG. 3 is a block diagram that illustrates components of the RO system in some embodiments. The RO system includes components used by an issuer node 310 and an owner node 320. The issuer node and owner node may interface with notary 330, other issuer nodes 340, and other owner nodes 350 via communications channel 360. In addition to having components for interfacing with other nodes, an issuer node may include an issue obligation component 311 and a process reissue proposal component 312, along with a transaction store 316. The issue obligation component is responsible for issuing obligations. The process reissue proposal component is responsible for processing reissue requests received from owner nodes. The transaction store stores the transactions of the issuer. The owner node includes a reissue obligations component 321, a retrieve ancestor transactions component 322, a reissue component 323, a propose reissue component 324, and a process issue proposal component 325, along with a transaction store 326. The reissue obligations component is responsible for coordinating the reissue obligations and invokes the retrieve ancestor transactions component to determine whether a reissue criterion is satisfied. If a reissue criterion is satisfied, the reissue component is invoked to reissue a transaction. The reissue component invokes the propose reissue component to coordinate the reissuing of the obligation. The process issue proposal component is invoked when an issue proposal is received from an issuer, whether for an original obligation or a reissue obligation. The transaction store stores the transactions of the owner. The issuer nodes 340 include components similar to the issuer node 310, and the owner nodes 350 include components similar to the owner node 320.

The computing systems (e.g., network nodes or collections of network nodes) on which the RO system and the CI system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the RO system and the CI system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The RO system and the CI system may be described in the general context of computer-executable instructions, such as program modules and components, executed by one or more computers, processors, or other devices. Generally, program modules or components include routines, programs, objects, data structures, and so on that perform tasks or implement data types of the RO system and the CI system. Typically, the functionality of the program modules may be combined or distributed as desired in various examples. Aspects of the RO system and the CI system may be implemented in hardware using, for example, an application-specific integrated circuit ("ASIC") or field programmable gate array ("FPGA").

Figure 4:
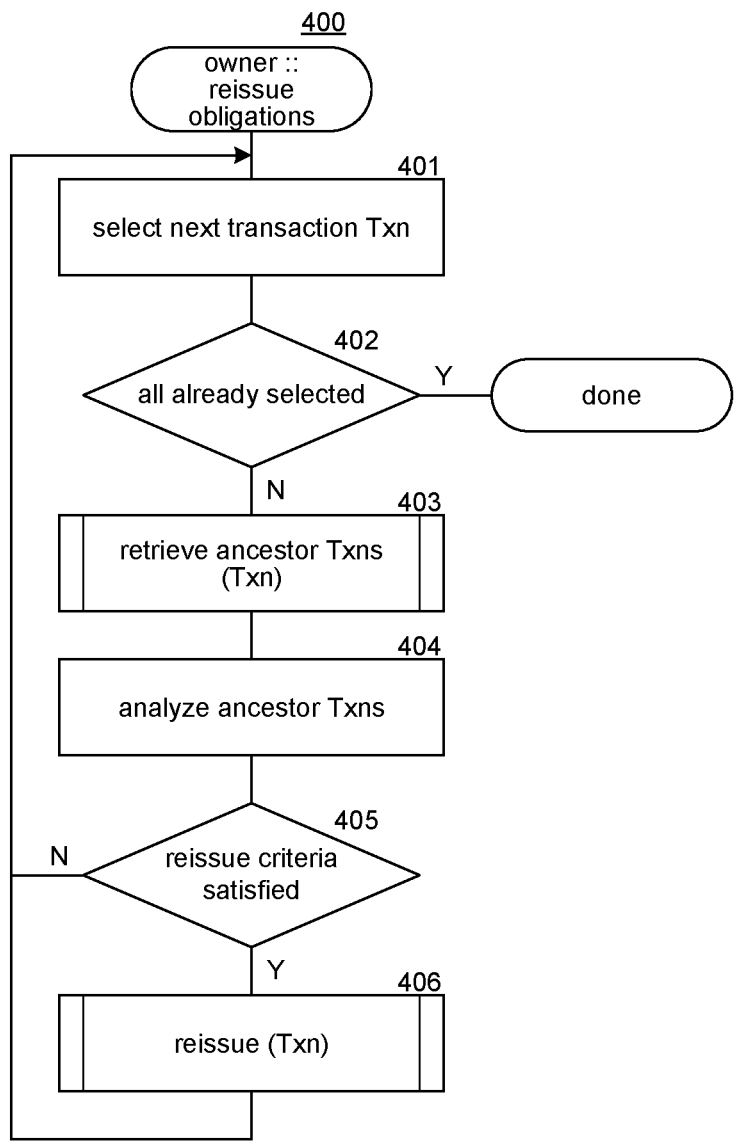
FIG. 4 is a flow diagram that illustrates processing of a reissue obligations component of an owner node in some embodiments.
Figure 5:
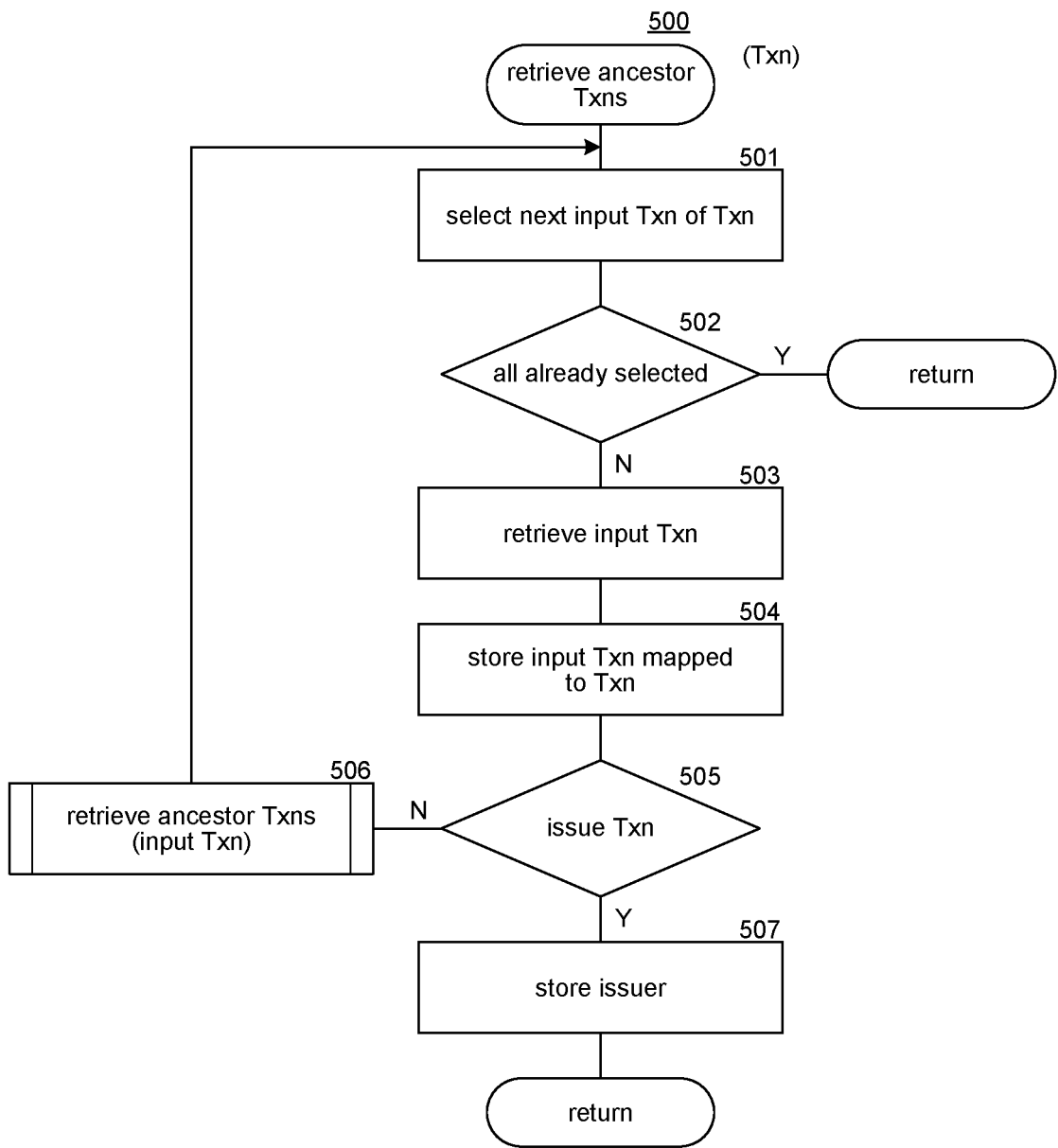
FIG. 5 is a flow diagram that illustrates the processing of a retrieve ancestor transactions component of an owner node in some embodiments.

FIG. 4 is a flow diagram that illustrates processing of a reissue obligations component of an owner node in some embodiments. A reissue obligations component 400 is invoked to determine whether to reissue obligations of the owner and coordinate their reissuance. In block 401, the component selects the next transaction of the transaction store that has not yet been fully consumed. In decision block 402, if all such transactions have already been selected, then the component completes, else the component continues at block 403. In block 403, the component invokes a retrieve ancestor transactions component, passing an indication of the selected transaction, to retrieve the ancestor transactions for the selected transaction. In block 404, the component analyzes the ancestor transactions to determine whether the issue criterion is satisfied for the selected transaction. In decision block 405, if the reissue criterion is satisfied, then the component continues at block 406, else the component loops to block 401 to select the next transaction. In block 406, the component invokes the reissue component, passing an indication of the selected transaction, to reissue the obligation of the selected transaction. The component then loops to block 401 to select the next transaction FIG. 5 is a flow diagram that illustrates the processing of a retrieve ancestor transactions component of an owner node in some embodiments. A retrieve ancestor transactions component 500 is passed an indication of a transaction and identifies all ancestor transactions. In block 501, the component selects the next input transaction that is a direct ancestor transaction of the passed transaction. In decision block 502, if all such input transactions have already been selected, then the component returns, else the component continues at block 503. In block 503, the component retrieves the selected input transaction from the distributed ledger. In block 504, the component stores the selected input transaction mapped to the passed transaction as an ancestor transaction. In decision block 505, if the selected input transaction is an issue transaction with no ancestors, then the component continues at block 507, else the component continues at block 506. In block 506, the component recursively invokes the retrieve ancestor transactions component passing an indication of the selected input transaction to identify its ancestor transaction and then loops to block 501 to select the next input transaction of the passed transaction. In block 507, the component stores an indication of the issuer and then returns.

Figure 6:
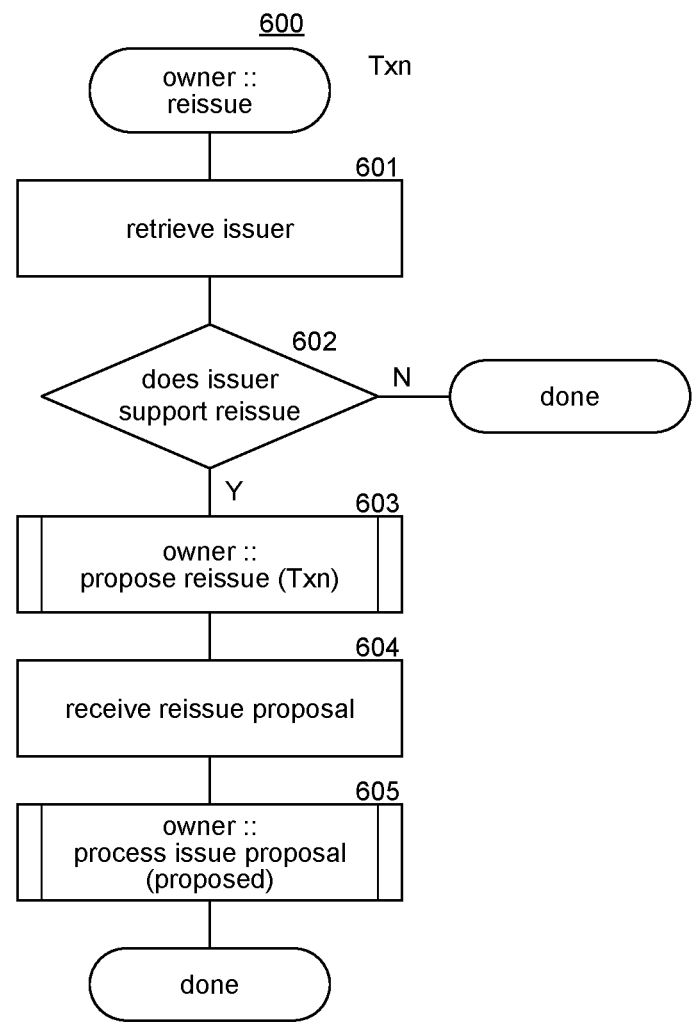
FIG. 6 is a flow diagram that illustrates the processing of a reissue component of an owner node in some embodiments.

FIG. 6 is a flow diagram that illustrates the processing of a reissue component of an owner node in some embodiments. A reissue component 600 is passed an indication of a target transaction and coordinates the reissue of the target transaction. In block 601, the component retrieves an indication of the issuer of the target transaction. In decision block 602, if the issuer supports reissuing of transactions, then the component continues at block 603, else the component completes. The determination of whether an issuer supports the reissuing of transactions generally or this target transaction in particular can be made in various ways. For example, the target transaction may include a flag signed by the issuer, the issuer may publicize whether it supports reissuing transactions, a message may be sent to the issuer asking whether it supports the reissuing of this target transaction, and so on. In block 603, the component invokes a propose reissue transaction of the owner node passing an indication of the transaction. In block 604, the component receives a reissue proposal from the issuer. In block 605, the component invokes the process issue proposal component, passing an indication of the reissue proposal, and then completes.

Figure 7:
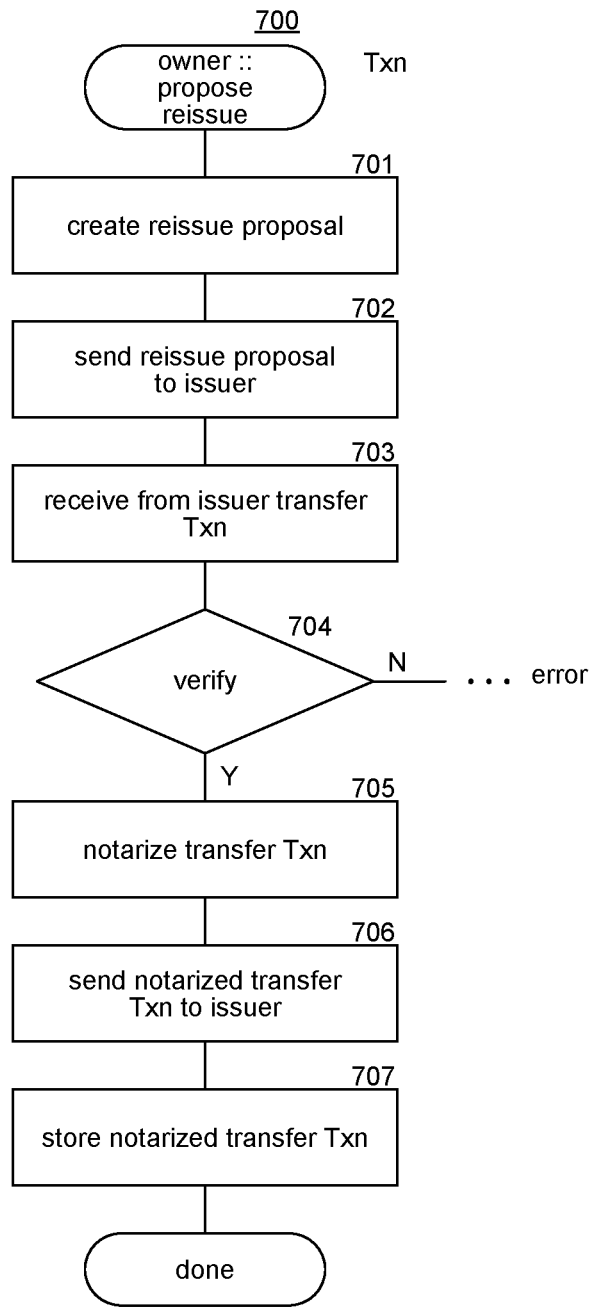
FIG. 7 is a flow diagram that illustrates the processing of a propose reissue component of an owner node in some embodiments.

FIG. 7 is a flow diagram that illustrates the processing of a propose reissue component of an owner node in some embodiments. A propose reissue component 700 is invoked, passing an indication of a target transaction whose target obligation is to be reissued. In block 701, the component creates a reissue proposal that identifies the target transaction. In block 702, the component sends the reissue proposal to the issuer. In block 703, the component receives from the issuer a transfer transaction to transfer ownership of the obligation to the issuer to retire the obligation. In decision block 704, if the component verifies that the transfer transaction is correct, then the component continues at block 705, else the component reports an error. In block 705, the component coordinates the notarizing of the transfer transaction by interacting with the notary node. In block 706, the component sends the notarized transfer transaction to the issuer as evidence that the transfer has been completed. In block 707, the component stores the notarized transfer transaction in the transaction store of the owner node. Alternatively, as discussed above, when the target obligation is transferred to the issuer, the issuer may simply create and sign the reissue transaction and send it to the owner node. In such a case, the owner node would not need to explicitly propose the reissue transaction. Also, the reissue transaction may not need to be notarized because it has no input transactions whose outputs might have already been consumed.

Figure 8:
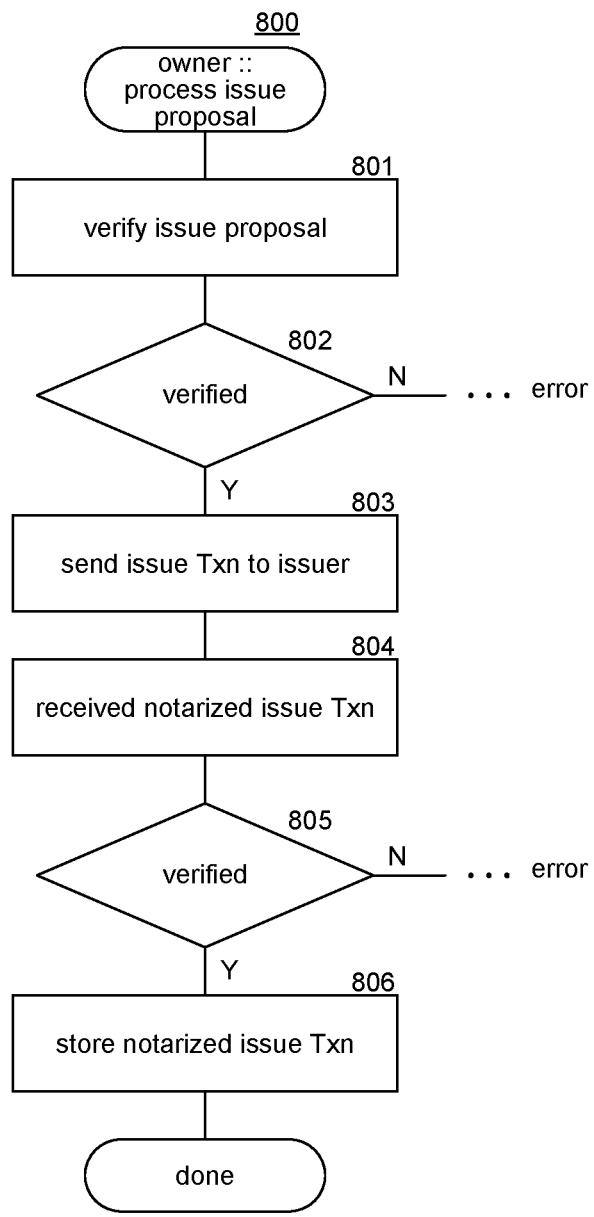
FIG. 8 is a flow diagram that illustrates the processing of a process issue proposal component of an owner node in some embodiments.

FIG. 8 is a flow diagram that illustrates the processing of a process issue proposal component of an owner node in some embodiments. A process issue proposal component 800 is invoked to process an issue proposal received from an issuer. The issue proposal can be for the issuance of a new obligation or reissuance of a target obligation that is being retired. In block 801, the component verifies that the issue proposal is acceptable. In decision block 802, if the issue proposal is verified as acceptable, then the component continues at block 803, else the component reports an error. In block 803, the component sends a signed issue transaction to the issuer. In block 804, the component receives the notarized issue transaction from the issuer. In decision block 805, if the notarized issue transaction is verified, then the component continues at block 806, else the component reports an error. In block 806, the component stores the notarized issue transaction in the transaction store of the owner node and then completes.

Figure 9:
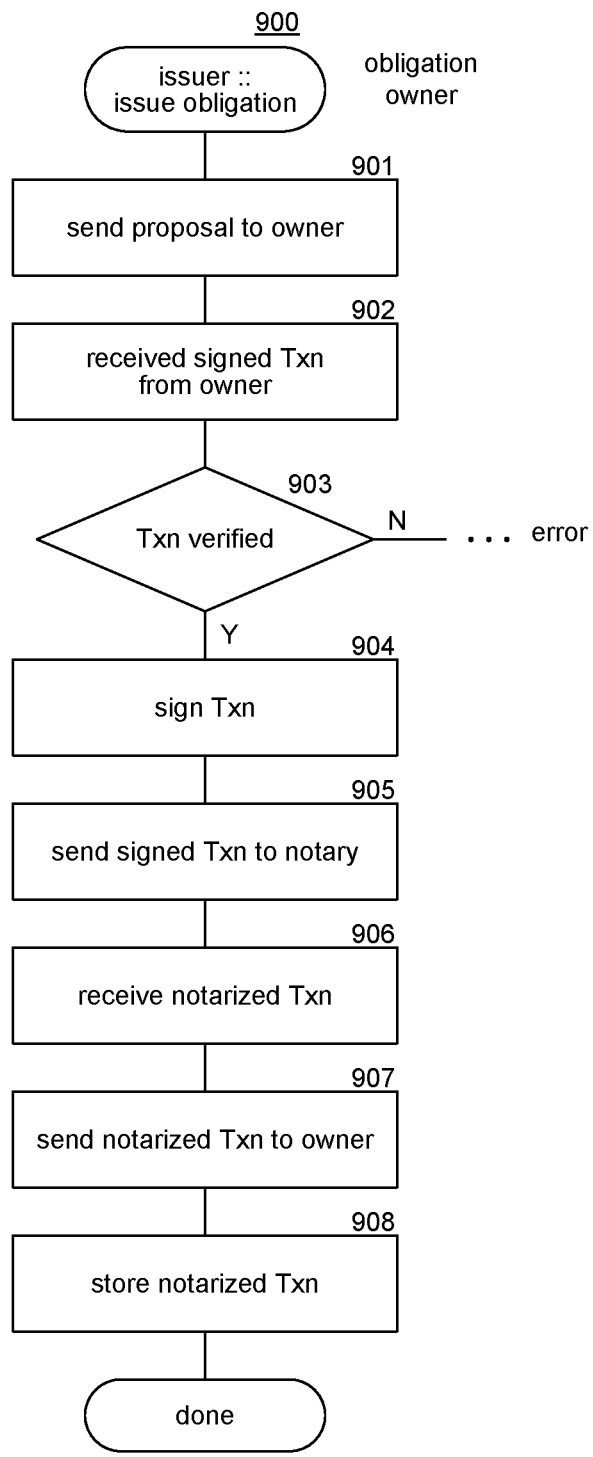
FIG. 9 is a flow diagram that illustrates the processing of an issue obligation component of an issuer node in some embodiments.

FIG. 9 is a flow diagram that illustrates the processing of an issue obligation component of an issuer node in some embodiments. An issue obligation component 900 is invoked, passing an indication of an obligation and the owner of the obligation. The component issues an obligation, which may be a reissued obligation. In block 901, the component sends a proposal for the issuance to the owner. In block 902, the component receives the signed issuance transaction from the owner. In decision block 903, if the received issuance transaction can be verified, then the component continues at block 904, else the component reports an error. In block 904, the component signs the issuance transaction with a signature of the issuer. In block 905, the component sends the signed issuance transaction to the notary. In block 906, the component receives the notarized issuance transaction from the notary. In block 907, the component sends the notarized issuance transaction to the owner. In block 908, the component stores the notarized issuance transaction in the transaction store of the issuer node and then completes.

Figure 10:
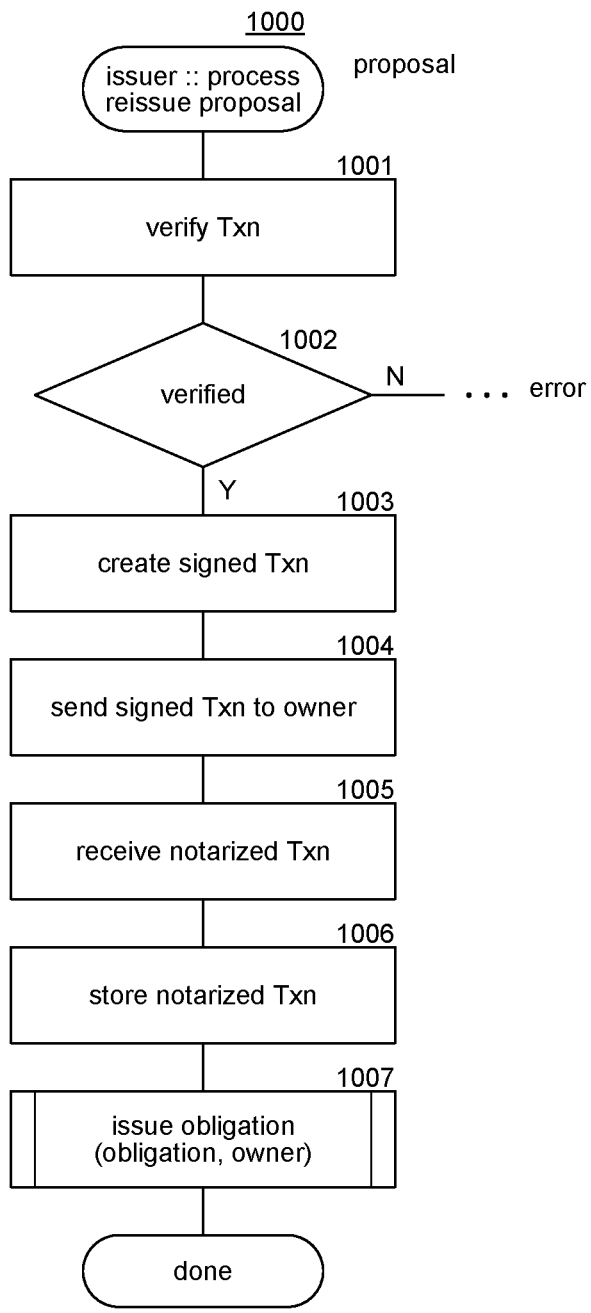
FIG. 10 is a flow diagram that illustrates processing of a process reissue proposal component of an issuer node in some embodiments.

FIG. 10 is a flow diagram that illustrates processing of a process reissue proposal component of an issuer node in some embodiments. A process reissue proposal component 1000 receives a reissue proposal and coordinates the reissuing of the target obligation indicated by the proposal. In block 1001, the component verifies the target transaction of the proposal. In decision block 1002, if the target transaction is verified, the component continues at block 1003, else the component reports an error. In block 1003, the component creates a signed transfer transaction to transfer the target obligation to the issuer to retire the target obligation. In block 1004, the component sends the signed transfer transaction to the owner. The owner may be the owner specified in the target transaction or may be a different owner to whom the target obligation is to be transferred as part of the reissuance. In block 1005, the component receives a notarized transfer transaction from the owner. In block 1006, the component stores the notarized transfer transaction in the transaction store of the owner node. In block 1007, the component invokes the issue obligation component to issue the reissue obligation in the name of the owner and then completes.

Figure 11:
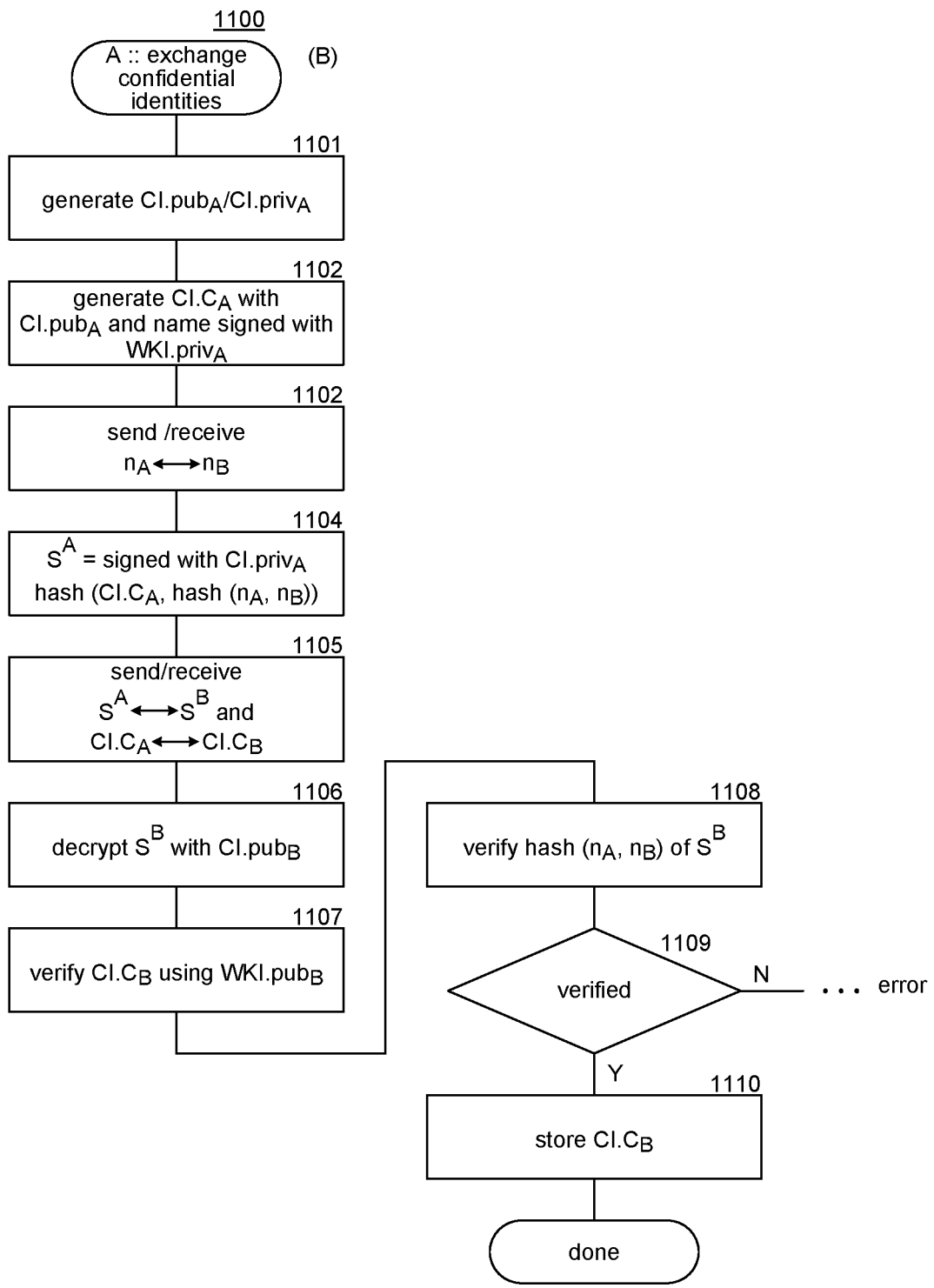
FIG. 11 is a flow diagram that illustrates the processing of an exchange confidential identities component of a CI system in some embodiments.

FIG. 11 is a flow diagram that illustrates the processing of an exchange confidential identities component of a CI system in some embodiments. An exchange confidential identities component 1100 is invoked for a party A to exchange their confidential identity with the confidential identity of a party B. In block 1101, the component generates a $CI.pub_A/CI.priv_A$ key pair. In block 1102, the component generates a confidential identity certificate $CI.C_A$ with the public key $CI.pub_A$ and the name $CI.name_A$ that is signed using $WKI.priv_A$. In block 1103, the component generates and sends to party B a nonce $n_A$ and receives from party B a nonce $n_B$. The nonces may help ensure that the confidential identities are from and intended for the other party. In block 1104, the component generates a signed hash $S^A$ by signing using $CI.priv_A$ a hash of the confidential identity certificate $CI.C_A$ combined with a hash of nonces $n_A$ and $n_B$. In block 1105, the component sends the signed hash $S^A$ and the confidential identity certificate $CI.C_A$ to party B and receives the signed hash $S^B$ and the confidential identity certificate $CI.C_B$ from party B. In block 1106, the component decrypts the signed hash $S^B$ using $CI.pub_B$. In block 1107, the component verifies the confidential identity certificate $CI.C_B$ using $WKI.pub_B$ to ensure that it was signed by party B. In block 1108, the component verifies that the decrypted hash of $S^B$ matches the hash of the certificate $CI.C_B$ combined with a hash of nonces $n_A$ and $n_B$. In decision block 1109, if the verifications are successful, then the component continues at block 1110, else the component reports an error. In block 1110, the component stores the confidential identity certificate $CI.C_B$ and then completes.

Figure 12:
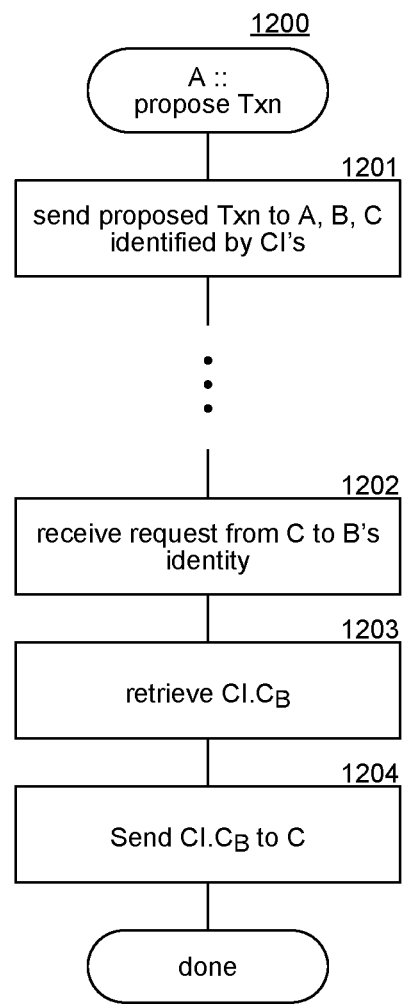
FIG. 12 is a flow diagram that illustrates the processing of a propose transaction component of the CI system in some embodiments.

FIG. 12 is a flow diagram that illustrates the processing of a propose transaction component of the CI system in some embodiments. A component 1200 is invoked to propose a transaction and to provide the identity of a party to the transaction identifies the parties by their confidential identities. In block 1201, the component sends to parties B and C a transaction proposed by party A. The proposed transaction identifies the parties by their confidential identities. Party A has received the confidential identity certificate $CI.C_B$ from party B and the confidential identity certificate $CI.C_C$ from party C. Party A may have also provided its confidential identity certificate $CI.C_A$ to party B and party C. Party C, however, does not have the confidential identity certificate $CI.C_B$ and thus cannot identify party B from the public key $CI.pub_B$ specified in the proposed transaction. Party C may need to know the identity of party B, for example, because of the laws of the governing jurisdiction. In block 1202, the component receives a request from party C for the confidential identity certificate $CI.C_B$ of party B so that party C can determine the identity of party B. In block 1203, the component retrieves the confidential identity certificate $CI.C_B$ that was stored in block 1110. In block 1204, the component sends the confidential identity certification $CI.C_B$ to party C. Party C can then use the name $CI.name_B$ of the confidential identity certificate $CI.C_B$ to retrieve the well-known certificate $WKI.C_B$. Party C can then verify the signature of confidential identity certificate $CI.C_B$ using the public key $WKI.pub_B$ to ensure that confidential identity certificate $CI.C_B$ was generated by party B and thus $CI.name_B$ and $WKI.name_B$ represent the identity of party B.

The following paragraphs describe various embodiments of aspects of the RO system and the CI system. An implementation of the RO system and the CI system may employ any combination of the embodiments. The processing described below may be performed by a computing device with a processor that executes computer-executable instructions stored on a computer-readable storage medium that implements the RO system.

In some embodiments, a method performed by one or more computing systems is provided for reissuing an obligation. The method accesses a target transaction that represents a target obligation of an issuer. The target transaction identifies a quantity of an asset of the target obligation and a first entity as current owner of the target obligation. The issuer is obligated to provide the quantity of the asset to the current owner in accordance with terms of the target obligation. The target transaction identifies an ancestor transaction that was consumed when creating the target transaction. An identifier of a second entity specified as then-owner of the target obligation in the ancestor transaction can be determined given the target transaction. The method creates a transfer transaction of the target transaction that transfers ownership of the target obligation to the issuer to retire the target obligation. The transfer transaction identifies the target transaction. The method receives from the issuer an indication that a reissue transaction was created that represents a reissued obligation of the issuer. The reissue transaction identifies the quantity of the asset of the reissued obligation and the first entity as current owner of the reissued obligation. The reissue transaction does not identify any ancestor transactions so that the identifier of the second entity cannot be determined from the reissue transaction. In some embodiments, the transactions are recorded in a blockchain. In some embodiments, the transactions are recorded in a distributed ledger that is not a blockchain. In some embodiments, the method further, prior to creating the transfer transaction, analyzes any ancestor transactions of the target transaction to determine whether a reissue criterion is satisfied. In some embodiments, the method further analyzes transactions to identify one or more target transactions to reissue. In some embodiments, the method further sends a reissue request to the issuer that identifies the transfer transaction. When the reissue request identifies a third entity, the reissue transaction identifies the third entity as current owner of the reissued obligation and the identifier of the first entity and the second entity cannot be determined from the reissue transaction. In some embodiments, a transaction specifies a type of the asset. In some embodiments, the asset is fungible. In some embodiments, the reissue transaction specifies a quantity of the asset of the reissued obligation that is less than the quantity specified by the target obligation.

In some embodiments, a method performed by one or more computing systems is provided for reissuing an obligation. The method accesses a target transaction in which an issuer has a target obligation to a target owner specified in the target transaction. The target transaction has one or more ancestor transactions that each specify an owner. The method retires the target transaction so that the issuer no longer has the target obligation. The method receives an indication that the issuer created a reissue transaction in which the issuer has a reissued obligation to the target owner that is specified in the reissue transaction. The reissue transaction does not any ancestor transactions. In some embodiments, the retiring of the target transaction includes creating a transfer transaction that transfers ownership of the target obligation to the issuer. In some embodiments, the target obligation specifies a quantity of an asset and the retiring of the target transaction creates a first transfer transaction that transfers ownership of a portion of the quantity of the target obligation to the issuer and a second transfer transaction that transfers ownership of the remaining portion of the quantity of the target obligation to an owner different from the issuer. In some embodiments, the method, prior to retiring the target transaction, analyzes one or more ancestor transactions of the target transaction to determine whether a reissue criterion is satisfied. In some embodiments, the method further analyzes transactions to identify one or more target transactions to reissue.

In some embodiments, a method performed by one or more computing systems is provided for reissuing an obligation. The method issues obligations by an issuer. The issuing of an obligation includes creating a transaction that specifies an owner of the obligation. The method receives a request to reissue a target obligation of an issuer. The request identifies a transfer transaction that specifies that the issuer is the owner of the target obligation and that specifies the prior owner of the target obligation. The method creates a reissue transaction in which the issuer has a reissued obligation to the prior owner that is specified in the reissue transaction. The reissue transaction does not have any ancestor transactions. In some embodiments, each obligation specifies a quantity of an asset and the reissued obligation is for the same quantity as the target obligation. In some embodiments, each obligation specifies a quantity of an asset and the reissued obligation is for a quantity less than the quantity of the target obligation. In some embodiments, the transfer transaction specifies a target transaction whose output is input to the transfer transaction and that identifies an owner of the target obligation of the target transaction, and the target transaction specifies a further input transaction whose output is input to the target transaction and that specifies an owner of the further input transaction. In some embodiments, an owner is specified by a public key.

In some embodiments, a computing system is provided for reissuing an obligation. The computing system includes one or more computer-readable storage mediums storing computer-executable instructions and one or more processors for executing the computer-executable instructions stored in the one or more computer-readable storage mediums. The instructions control the computing system to access a target transaction in which an issuer has a target obligation to a target owner specified in the target transaction. The instructions control the computing system to retire the target transaction so that the issuer no longer has the target obligation. The instructions also control the computing system to receive an indication that the issuer has created a reissue transaction in which the issuer has a reissued obligation to the target owner that is specified in the reissue transaction. In some embodiments, the instructions that retire the target transaction create a transfer transaction that transfers ownership of the target obligation to the issuer. In some embodiments, the target obligation specifies a quantity of an asset and the instructions that retire the target transaction create a first transfer transaction that transfers ownership of a portion of the quantity of the target obligation to the issuer and a second transfer transaction that transfers ownership of the remaining portion of the quantity of the target obligation to an owner different from the issuer. In some embodiments, the target transaction specifies a prior transaction, and the reissue transaction does not specify a prior transaction.

In some embodiments, a method performed by one or more computing systems is provided for providing a confidential identity for an entity. The method generates a confidential public/private key pair. The method generates a confidential certificate for the confidential identity. The confidential certificate includes the confidential public key and a well-known name of the entity. The method signs the confidential certificate with a well-known public key of the entity. The method sends the signed confidential certificate to another party. In some embodiments, the method further receives a nonce from the other entity, generates a nonce, sends the generated nonce to the other entity, signs received nonce and the sent nonce, and sends the signed nonces to the other entity. In some embodiments, the signing of the confidential certificate and the signing of the nonce are performed by a signing of a combination of the confidential certificate and the nonces. In some embodiments, the method further receives a signed confidential certificate from the other party. The method further verifies using a well-known public key of the other party that the received signed confidential certificate was signed by the other party. The method also further stores the received confidential certificate for use in identifying the other party from the confidential public key of the received confidential certificate.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A computing system for reissuing an obligation to preserve privacy of a first owner of an obligation that is transferred to a second owner, each owner having at least one node of a distributed ledger system comprising a plurality of nodes, each node of an owner storing transactions associated with that owner, the computing system comprising:
   one or more processors; and
   one or more computer-readable storage media storing computer-executable instructions which, when executed by the one or more processors, cause the computing system to perform steps comprising:
      access a target transaction in which an issuer has a target obligation to the first owner, wherein the target transaction is linked to a chain of ancestor transactions, each ancestor transaction in the chain of ancestor transactions linked to the target transaction identifying at least one prior owner of the target obligation, the target transaction and the ancestor transactions being stored at a node of the distributed ledger system, creating a first transfer transaction, signing the first transfer transaction with a private key of a public/private key pair, receive, from the issuer, an indication that the issuer has accepted transfer of ownership of the target obligation to the issuer, send to the issuer a request to reissue the target obligation to the second owner via a reissue transaction with no ancestor transactions, receive, from the issuer, an indication of a reissue transaction indicating that the issuer has reissued an obligation to the second owner, the reissue transaction including an identification of the second owner, the reissue transaction not referencing any ancestor transactions and not including an identification of the first owner, and receiving an indication that the reissue transaction has been recorded in the distributed ledger system, wherein a party that has access to the reissue transaction cannot identify any prior owner of the target obligation from the reissue transaction.

2. The computing system of claim 1 wherein the instructions which, when executed by the one or more processors, cause the computing system to perform steps comprising transfer ownership of the target obligation to the issuer, further cause the computing system to perform steps comprising:

send an indication of the first transfer transaction to the issuer.

3. The computing system of claim 1 wherein the target obligation comprise an indication of a quantity of an asset and the instructions which, when executed by the one or more processors, cause the computing system to transfer ownership, further cause the computing system to perform steps comprising:

transfer ownership of a portion of the quantity of the target obligation to the issuer by creating a second transfer transaction; and transfer ownership of the remaining portion of the quantity of the target obligation to an owner different from the issuer by creating a third transfer transaction.

4. The computing system of claim 1 wherein the target transaction comprise an indication of a prior transaction and the reissue transaction does not comprise an indication of a prior transaction.

5. The computing system of claim 1 wherein the instructions, when executed by the one or more processors, cause the computing system to perform steps comprising:

signing the first transfer transaction with a private key of a public/private key pair;

send the signed first transfer transaction to a notary service; and receive a notarized transfer transaction that is signed by the notary service with a private key of a public/private key pair of the notary service.

6. The computing system of claim 1 wherein the transactions are recorded in a distributed ledger that is not a blockchain.

7. The computing system of claim 1 wherein the one or more computer-readable storage media further store instructions which, when executed by the one or more processors, cause the computing system to perform steps comprising:

for each of a plurality of transactions, retrieving ancestor transactions for the transaction, determining whether an issue criterion is satisfied for the transaction based at least in part on the retrieved ancestor transactions, and in response to determining that an issue criterion is satisfied for the transaction, invoking a reissue component to reissue an obligation of the transaction.

8. The computing system of claim 3 wherein the reissue transaction comprises an indication of a quantity of an asset that is less than the indicated quantity that the target obligation comprises.

9. The computing system of claim 1 wherein the target obligation and the reissued obligation each comprise an indication of a quantity of an asset and the quantity indicated by the reissued obligation is the same as the quantity indicated by the target obligation.

10. The computing system of claim 1 wherein the target transaction and the reissue transaction are signed by a public key of a public/private key pair of the issuer.

11. The computing system of claim 1 wherein the target transaction and the reissue transaction are signed by a public key of a public/private key pair of the first owner.

12. A method performed by a computing system for reissuing an obligation to preserve privacy of a first owner of an obligation that is transferred to a second owner, each owner having at least one node of a distributed ledger system comprising a plurality of nodes, each node of an owner storing transactions associated with that owner, the method comprising:

accessing a target transaction in which an issuer has a target obligation, to the first owner, specified in the target transaction, wherein the target transaction is linked to a chain of ancestor transactions, each ancestor transaction in the chain of ancestor transactions linked to the target transaction identifying at least one prior owner of the target obligation, the target transaction and the ancestor transactions being stored at a node of the distributed ledger system;

creating a transfer transaction;

receiving, from a node of the issuer, an indication that the issuer has accepted transfer of ownership of the target obligation;

sending to the issuer a request to reissue the target obligation to the second owner as a reissued transaction with no ancestor transactions;

receiving, from a node of the issuer, an indication of a reissue transaction indicating that the issuer has reissued an obligation to the second owner, the reissue transaction not referencing any ancestor transactions and not including an identification of the first owner; and receiving an indication that the reissue transaction has been recorded in the distributed ledger system, wherein a party that has access to the reissue transaction cannot identify any prior owner of the target obligation from the reissue transaction.

13. The method of claim 12, further comprising:

prior to transferring ownership of the target transaction, analyzing one or more ancestor transactions of the target transaction to determine whether a reissue criterion is satisfied.

14. A computer-readable storage medium storing computer-executable instructions that, when executed by a computing system having at least one memory and at least one processor, cause the computing system to perform operations comprising:

accessing a target transaction in which an issuer has a target obligation, to a first owner, specified in the target transaction, wherein the target transaction is linked to a chain of ancestor transactions, each ancestor transaction in the chain of ancestor transactions linked to the target transaction identifying at least one prior owner of the target obligation, the target transaction and the ancestor transactions being stored at a node of a distributed ledger system comprising a plurality of nodes, each of a plurality of owners having at least one node, each node of an owner storing transactions associated with that owner;

creating a transfer transaction indicating a transfer of ownership to the issuer;

receiving, from a node of the issuer, an indication that the issuer has accepted transfer of ownership of the target obligation;

sending to the issuer a request to reissue the target obligation to a second owner as a reissued transaction with no ancestor transactions;

receiving, from a node of the issuer, an indication of a reissue transaction indicating that the issuer has reissued an obligation to the second owner, the reissue transaction not referencing any ancestor transactions and not including an identification of the first owner; and receiving an indication that the reissue transaction has been recorded in the distributed ledger system, wherein a party that has access to the reissue transaction cannot identify any prior owner of the target obligation from the reissue transaction.

15. The computer-readable storage medium of claim 14, the operations further comprising:

sending the transfer transaction to a notary.

16. The computer-readable storage medium of claim 15, the operations further comprising:

receiving, from the notary, a notarized transfer transaction; and after receiving the notarized transfer transaction,
recording the notarized transfer transaction in the distributed ledger system, and
sending the notarized transfer transaction to the first owner.

17. The method of claim 12, further comprising:
sending the transfer transaction to a notary.

18. The method of claim 17, further comprising:
receiving, from the notary, a notarized transfer transaction; and after receiving the notarized transfer transaction,
recording the notarized transfer transaction in the distributed ledger system, and
sending the notarized transfer transaction to the first owner.

19. The method of claim 12, further comprising:
recording the reissue transaction in the distributed ledger system.

20. The computer-readable storage medium of claim 14, the operations further comprising:
storing a notarized transfer transaction in a transaction store.

* * * * *